(12) United States Patent
Matalon (10) Patent No.: US 9,157,534 B2
(45) Date of Patent: Oct. 13, 2015

(54) TWO-STUD DIAPHRAGM FOR DIAPHRAGM VALVES

(75) Inventor: Louis E. Matalon, Lancaster, PA (US)

(73) Assignee: ITT MANUFACTURING ENTERPRISES LLC., Wilmington, DE (US)

( * ) Notice: Subject to any disclaimer, the term of this patent is extended or adjusted under 35 U.S.C. 154(b) by 96 days.

(21) Appl. No.: 13/554,535

(22) Filed: Jul. 20, 2012

(65) Prior Publication Data

US 2014/0021392 A1  Jan. 23, 2014

(51) Int. Cl.
  *F16K 7/12* (2006.01)
  *F16K 7/16* (2006.01)

(52) U.S. Cl.
  CPC .. *F16K 7/126* (2013.01); *F16K 7/16* (2013.01)

(58) Field of Classification Search
  CPC ............ F16K 7/16; F16K 7/126; F16K 7/12; F16K 41/12; F16J 3/02
  USPC .............. 251/331, 335.2, 61–61.5; 92/96, 97, 92/98 R, 99
  See application file for complete search history.

(56) References Cited

U.S. PATENT DOCUMENTS

| | | | |
|---|---|---|---|
| 195,596 A | 9/1877 | Fenn et al. | |
| 1,609,813 A | 12/1926 | Gorman | |
| 1,992,043 A | 2/1935 | Saunders | |
| 2,388,989 A * | 11/1945 | Mueser | 251/265 |
| 2,504,057 A | 4/1950 | Trefil | |
| 2,582,996 A | 1/1952 | Laurent | |
| 2,710,629 A * | 6/1955 | Price | 251/331 |
| 2,717,757 A | 9/1955 | Bowlzer | |
| 2,872,935 A | 2/1959 | Kenney | |
| 3,026,852 A | 3/1962 | Stelzer | |
| 3,067,764 A | 12/1962 | Geary | |
| 3,148,861 A | 9/1964 | McFarland, Jr. | |
| 3,204,919 A | 9/1965 | Tripoli et al. | |
| 3,257,095 A | 6/1966 | Siver | |
| 3,349,795 A | 10/1967 | Matsutani | |

(Continued)

FOREIGN PATENT DOCUMENTS

| | | |
|---|---|---|
| DE | 3447329 | 7/1986 |
| DE | 102009023002 | 12/2010 |

(Continued)

OTHER PUBLICATIONS

English Language Abstract WO2008034686 (1 page), Jun. 3, 2009.

(Continued)

*Primary Examiner* — Marina Tietjen
*Assistant Examiner* — Michael R Reid (57) ABSTRACT

A diaphragm valve features a valve body having a fluid flow channel with a weir portion to control the flow of fluid through the fluid flow channel; a diaphragm that responds to a closing or force to make sealing contact with the weir portion to interrupt said flow, or to release the sealing contact with the weir portion to allow the flow; a compressor configured to apply the closing or force in order to interrupt or allow the flow; and two studs configured to: couple the compressor and the diaphragm together, attach to the diaphragm to provide attachment points on the diaphragm on each side of the weir portion, and respond to the closing or opening force so the attachment points on both sides of the weir portion cause the diaphragm to make sealing contact with the weir portion or cause the sealing contact to be released.

8 Claims, 6 Drawing Sheets

Non-Criticality of Stud Postion for
Reliable Seal & Improved Opening

(56) References Cited

U.S. PATENT DOCUMENTS

| | | | |
|---|---|---|---|
| 3,521,667 A | 7/1970 | Johnson | |
| 3,561,480 A | 2/1971 | Fairchild | |
| 3,631,882 A | 1/1972 | White, Jr. | |
| 3,811,649 A * | 5/1974 | Press et al. | 251/8 |
| 3,982,729 A | 9/1976 | Tricini | |
| 4,014,514 A | 3/1977 | Priese et al. | |
| 4,026,513 A * | 5/1977 | Callenberg | 251/61.1 |
| 4,077,605 A | 3/1978 | Kutz et al. | |
| 4,214,604 A | 7/1980 | Rumsey | |
| 4,231,549 A | 11/1980 | Visalli | |
| 4,295,485 A | 10/1981 | Waterfield | |
| 4,452,428 A | 6/1984 | Scaramucci | |
| 4,498,798 A | 2/1985 | Day | |
| 4,746,095 A | 5/1988 | Roush | |
| 4,750,709 A | 6/1988 | Kolenc et al. | |
| 5,029,813 A | 7/1991 | Walton et al. | |
| 5,295,662 A | 3/1994 | Yamaji et al. | |
| 5,411,350 A | 5/1995 | Breault | |
| 5,551,477 A | 9/1996 | Kanno et al. | |
| 5,597,184 A | 1/1997 | Brenes et al. | |
| 5,624,102 A | 4/1997 | Nishimura et al. | |
| 5,669,596 A | 9/1997 | Yoshikawa et al. | |
| 6,007,045 A | 12/1999 | Heiniger et al. | |
| 6,056,003 A | 5/2000 | Madsen et al. | |
| 6,123,315 A | 9/2000 | Keller | |
| 6,155,535 A | 12/2000 | Marcilese | |
| 6,227,520 B1 | 5/2001 | Huber, Jr. | |
| 6,296,227 B1 | 10/2001 | Burcham et al. | |
| 6,443,426 B1 | 9/2002 | Brenes | |
| 6,845,959 B2 | 1/2005 | Berckenhoff et al. | |
| 7,059,584 B2 | 6/2006 | Balasubramanian | |
| 7,377,483 B2 | 5/2008 | Iwabuchi et al. | |
| 7,628,376 B2 | 12/2009 | Masamura et al. | |
| 7,789,012 B2 | 9/2010 | Marcilese et al. | |
| 7,815,169 B2 | 10/2010 | Arosio | |
| 8,056,578 B2 | 11/2011 | Lopp et al. | |
| 2005/0045847 A1 | 3/2005 | Powell | |
| 2011/0031427 A1 | 2/2011 | Sitnikov | |
| 2012/0061597 A1 | 3/2012 | Speer | |
| 2012/0068102 A1 | 3/2012 | Anagnos et al. | |

FOREIGN PATENT DOCUMENTS

| | | |
|---|---|---|
| EP | 0023409 | 2/1981 |
| EP | 0099945 | 2/1984 |
| EP | 0870957 | 10/1998 |
| EP | 1138989 | 10/2001 |
| EP | 2064468 | 7/2011 |
| GB | 794992 | 5/1958 |
| GB | 685935 | 1/1965 |
| GB | 1011970 | 12/1965 |
| GB | 1080902 | 8/1967 |
| GB | 2173882 | 10/1986 |
| GB | 2460227 | 11/2009 |
| IL | 35178 | 4/1973 |
| JP | H0193674 | 4/1989 |
| JP | 2004204977 | 7/2004 |
| JP | 2008190546 | 8/2008 |
| WO | 9500782 | 1/1995 |
| WO | 9717558 | 5/1997 |
| WO | 2011014436 | 2/2011 |

OTHER PUBLICATIONS 2 pgs. JPH0193674 English Language Abstract.
1 pg JP2008190546 English Language Abstract.
1 pg EP0870957 English Language Abstract.
1 pg DE3447329 English Language Abstract.
1 page DE102009023002 English Language Abstract.
2 pgs JP2004204977 English Language Abstract.

* cited by examiner

FIG. 1a (PRIOR ART): Weir Cross Section of Traditional PTFE Diaphragm Valve Sealing Components

FIG. 1b (PRIOR ART): Expanded 3D View Of Traditional Sealing Components

*FIG. 2*: Expanded 3d View of Preferred Sealing Components

*FIG. 3*: Section—Centerline of the Weir
(Uninterrupted, uniform gasket is accomplished)

*FIG. 4*: Section—Diaphragm Dual Supports
(Preferred method to achieve diaphragm opening)

FIG. 5: Diaphragm Ease of Attachment (Slide on attachment)

FIG. 6: Section—Installed 3 Point Constraint (Insured Orientation)

*FIG. 7*: Non–Criticality of Stud Postion for Reliable Seal & Improved Opening

TWO-STUD DIAPHRAGM FOR DIAPHRAGM VALVES

BACKGROUND OF THE INVENTION

1. Field of the Invention

The present invention relates to a diaphragm valve; and more particularly relates to a weir-type diaphragm valve.

2. Brief Description of Related Art

Figure 1A:
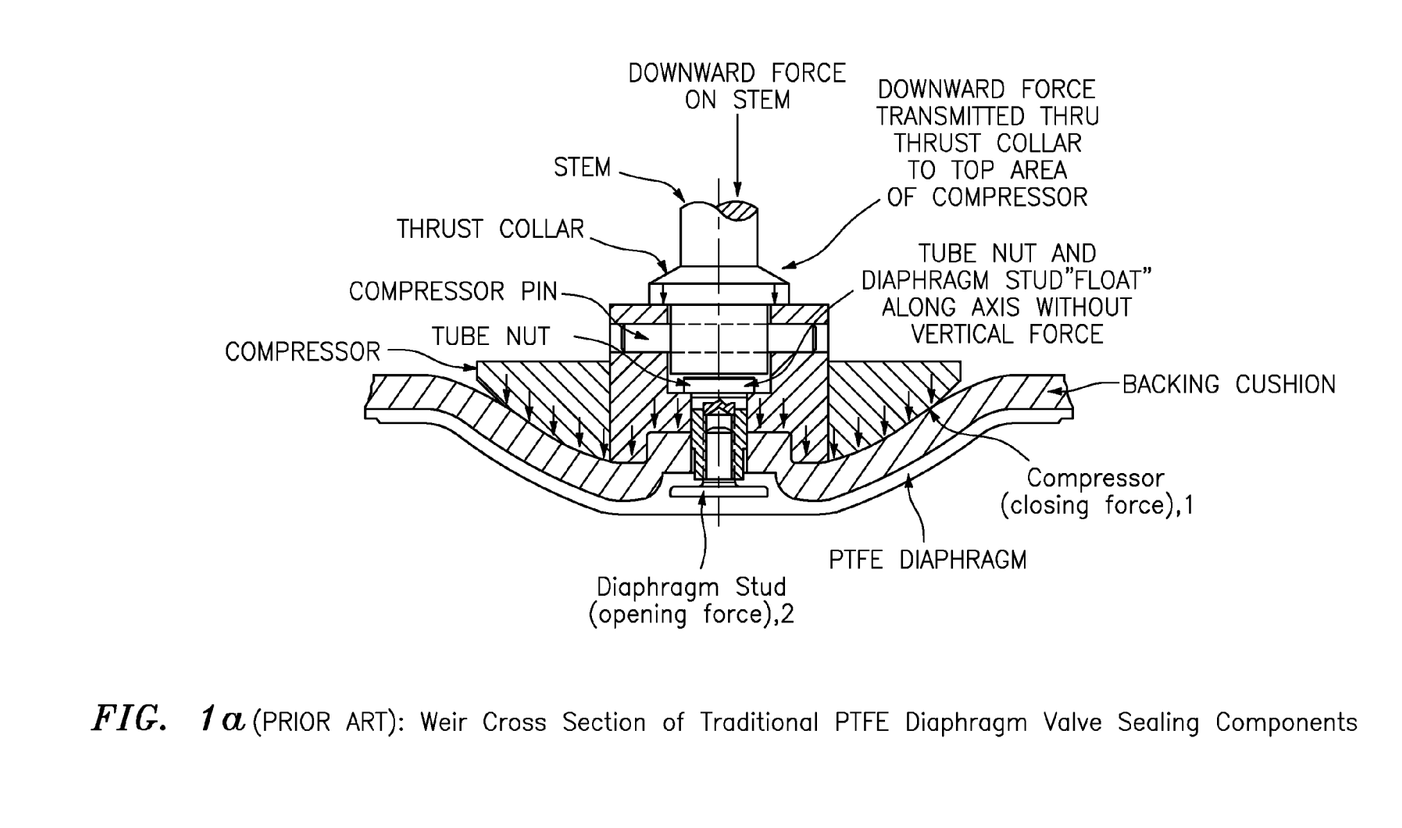
FIG. 1a is a cross-section of a known Weir diaphragm valve having traditional PTFE valve sealing components.
Figure 1B:
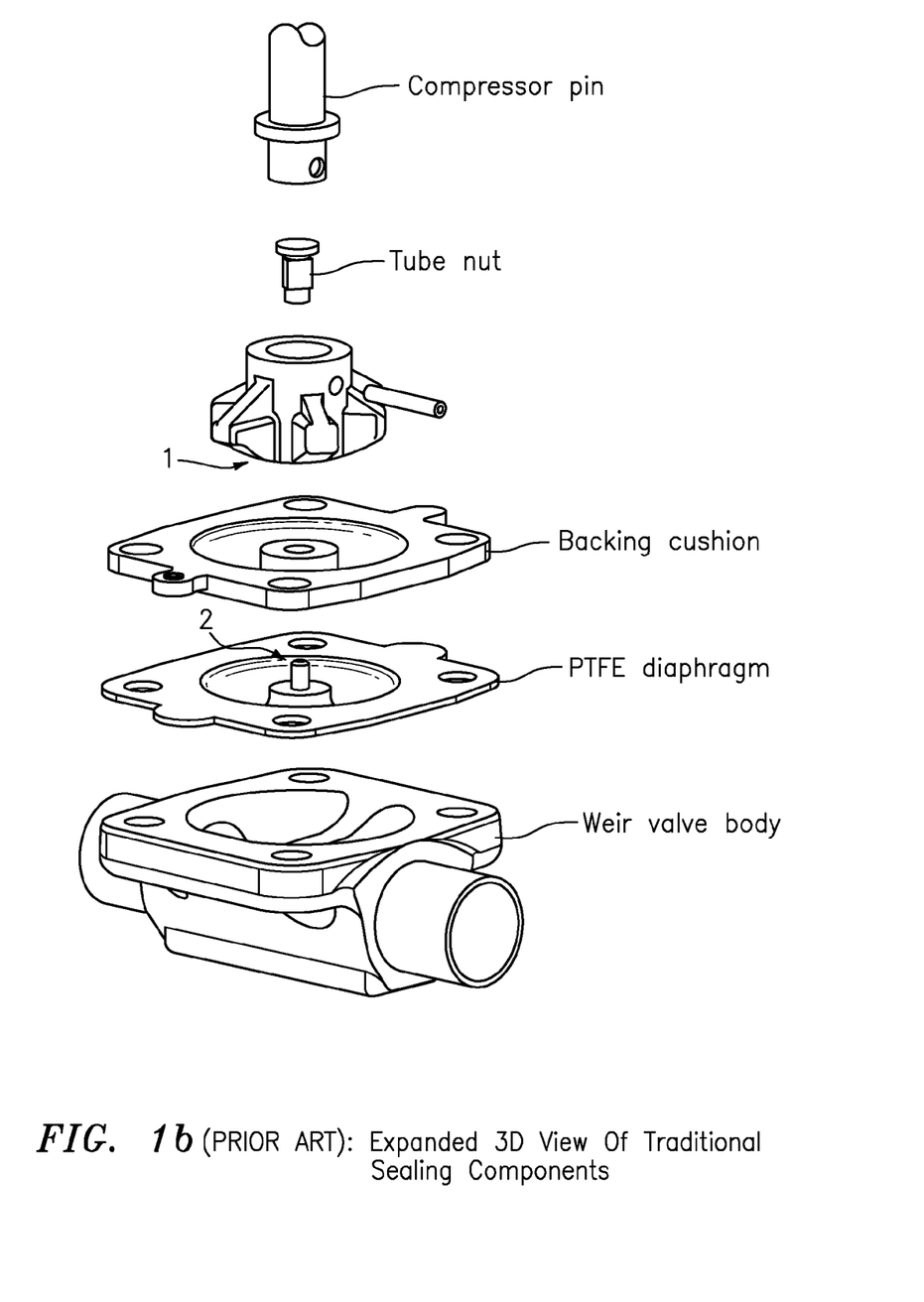
FIG. 1b is an exploded view of traditional sealing components of a known Weir valve.

FIGS. 1a and 1b show a diaphragm valve that is known in the art. In such a diaphragm valve, the diaphragm requires two mechanisms to make the valve work in both pressure and vacuum service conditions. A closing force, provided through the compressor (1), and an opening force, applied through the diaphragm stud (2), can be applied in numerous ways. Normally, a diaphragm stud is located in the center of the diaphragm. The stud and stud retention components create a non-uniformity in the sealing gasket cross section. This non-uniformity interrupts the pressure applied to the contact surface between the weir and diaphragm along the sealing bead of the valve body. This interruption can cause inconsistency of sealing for three reasons:

1) If the stud is too long or adjusted improperly, it can result in over compression of the diaphragm in the center, causing poor valve sealing characteristics and possible damage to the diaphragm.
2) If the stud is too short or adjusted improperly, it can result in under compression of the diaphragm in the center, causing poor valve sealing characteristics.
3) The transition area between the center seal line under the stud and the side seal line of the compressor may not experience the required seal pressure even if the pressure under the aforementioned components are balanced.

It is noted that the peripheral seal of the valve body is independent of the aforementioned weir portion sealing and is made by components omitted from FIGS. 1a, 1b.

SUMMARY OF THE INVENTION

According to some embodiments, the present invention may take the form of apparatus, including a diaphragm valve, that includes a valve body, a diaphragm, a compressor, and at least two studs. The valve body has a fluid flow channel and may be configured with a weir portion to control the flow of fluid through the fluid flow channel. The diaphragm may be configured to respond to a closing force and to an opening force to make sealing contact with the weir portion to interrupt the flow, or to release the sealing contact with the weir portion to allow the flow. The compressor may be configured to apply the closing force or the opening force in order to interrupt or allow the flow. The at least two studs may be configured to:
  couple the compressor and the diaphragm together,
  attach to the diaphragm so as to provide attachment points on the diaphragm on each side of the weir portion, and
  respond to the closing force or the opening force so that the attachment points on both sides of the weir portion cause the diaphragm to make sealing contact with the weir portion or cause the sealing contact to be released.

According to some embodiments of the present invention, each stud may be configured with one end embedded within the diaphragm, and with another end having a ball-like member.

According to some embodiments of the present invention, the compressor may be configured with two slots, each slot of the compressor configured to receive and engage a respective ball-like member on a respective end of a respective stud.

According to some embodiments of the present invention, the valve body may be configured with a diaphragm attachment pin; and the diaphragm may be configured with a portion configured with a diaphragm attachment pin aperture to receive and engage the diaphragm attachment pin to provide a slide on attachment and three point constraint to keep each ball in the respective slot of the compressor.

According to some embodiments of the present invention, the apparatus may include a backing cushion arranged between the compressor and the diaphragm, and configured with two apertures for receiving and passing the two studs. The backing cushion may be made of an elastomeric material, and may be a composite of an elastomeric material containing a fiber or a fiber mesh.

According to some embodiments of the present invention, more than two studs may be used. For example, the at least two studs may take the form of four studs that are configured to couple the compressor and the diaphragm together; and attach to the diaphragm so as to provide four attachment points, e.g., including two attachment points on the diaphragm on each side of the weir portion. Alternatively, the at least two studs may take the form of three studs that are configured to couple the compressor and the diaphragm together; and attach to the diaphragm so as to provide three attachment points, e.g., including two attachment points on the pressure side of the weir portion and one attachment point on the outlet side of the weir portion.

In effect, in the present invention a weir gasket seal, made up of the diaphragm and backing cushion, is uninterrupted by the diaphragm stud connection. This allows controlled and even compression of the diaphragm along the entire length of the weir portion of the valve body. The technique according to the present invention replaces the single center attachment used in the prior art with two attachment points to either side of the weir gasket seal. The attachment mechanism disclosed herein take the form of the two studs embedded within a PTFE diaphragm on one end, and threaded into balls on the other end. The attachment mechanism according to the present invention may also take the form of a single piece, e.g., based at least part of design factors or parameters, such as cost and reliability. The technique according to the present invention as disclosed herein uses a uniform layer of PTFE and a uniform layer of elastomer between the compressor and the weir valve body. The PTFE diaphragm contacts the process fluid and makes the seal to the weir valve body. The fiber/elastomeric composite provides membrane strength to resist the high pressure of the process fluid, and provides compliance, resulting in a well distributed seal pressure transmission to the PTFE diaphragm and weir portion of the valve body.

BRIEF DESCRIPTION OF THE DRAWING

The drawing includes the following Figures, not necessarily drawn to scale.

In the following description of the exemplary embodiment, reference is made to the accompanying Figures in the drawing, which form a part hereof, and in which are shown by way of illustration of an embodiment in which the invention may be practiced. It is to be understood that other embodiments may be utilized, as structural and operational changes may be made without departing from the scope of the present invention.

DETAILED DESCRIPTION OF THE INVENTION

Figure 2:
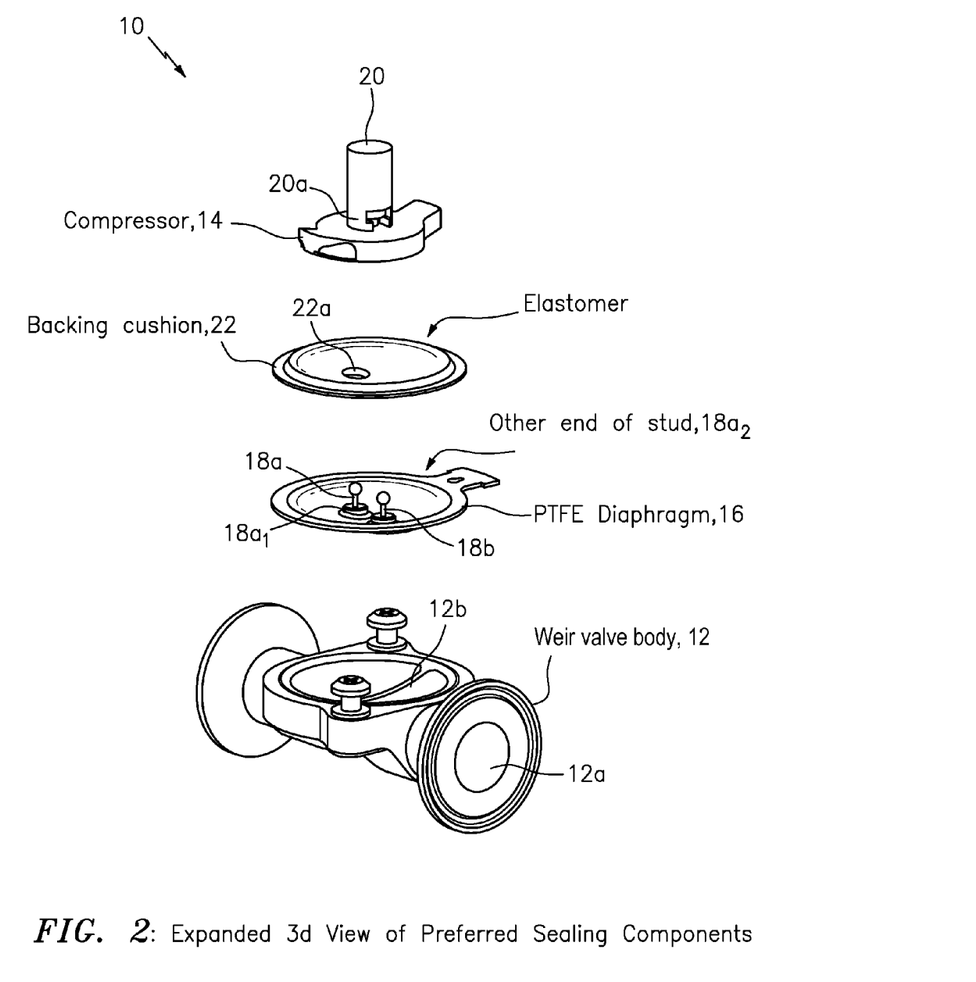
FIG. 2 is an expanded three dimensional view of sealing components in relation to the valve body according to some embodiments of the present invention.
Figure 3:
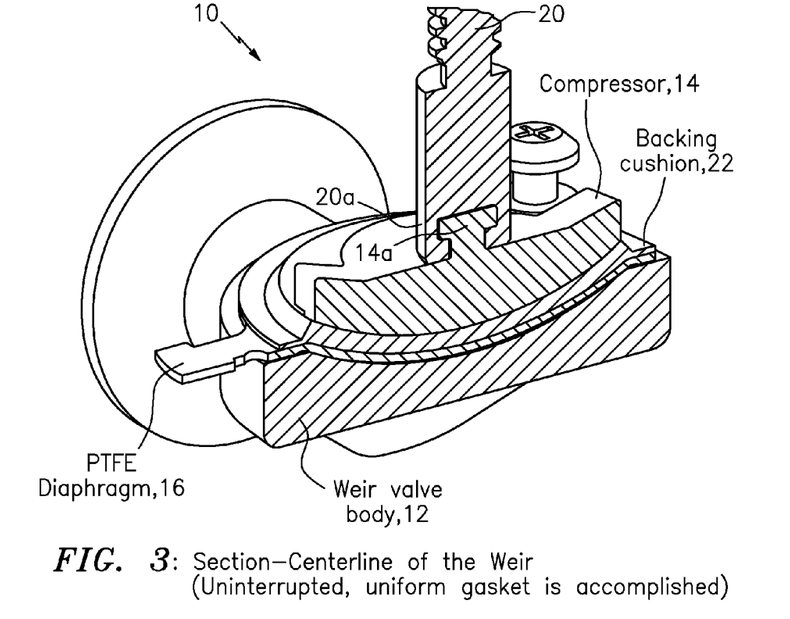
FIG. 3 is a cross-sectional centerline view (transverse to the direction of flow) of sealing components in relation to the valve body according to some embodiments of the present invention.
Figure 4:
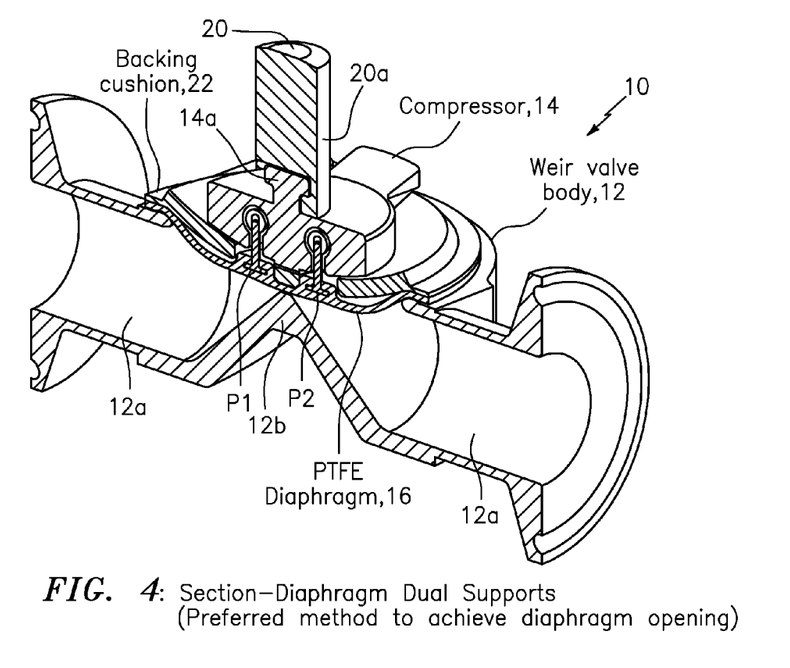
FIG. 4 is a cross-sectional view (parallel to the direction of flow) of sealing components in relation to the valve body according to some embodiments of the present invention.

FIGS. 2-4 shows apparatus, in the form of a diaphragm valve, generally indicated as 10 according to some embodiments of the present invention, having a valve body 12, a compressor 14, a diaphragm 16 and at least two studs 18a, 18b.

The valve body 12 has a fluid flow channel 12a configured with a weir portion 12b to control the flow of fluid through the fluid flow channel 12a. The weir portion 12b is understood, and known in the art, as a dam-like portion that is raised and extended across the fluid flow channel 12a, and typically forms part of a Weir-type diaphragm valve. The valve body 12 may also be configured with a diaphragm attachment pin 12c (see FIGS. 5-6).

The compressor 14 may be configured to apply a closing force in order to interrupt the flow of fluid through the fluid flow channel 12a of the valve body 12, and also configured to apply an opening force in order to allow the flow of fluid through the fluid flow channel 12a of the valve body 12, consistent with that set forth herein. The compressor 14 may be coupled to a spindle 20. As shown, the compressor 14 has a male coupling member 14a configured to be received and coupled to a female coupling member 20a of the spindle 20. The spindle 20 may be configured to receive and apply the closing force and the opening force on the compressor 14, although the scope of the invention is not intended to be limited to the manner or technique in which the spindle 20 receives or applies the closing force and the opening force. The technique for coupling the compressor 14 and spindle 20 is shown by way of example, and the scope of the invention is also not intended to be limited to any particular type or kind of technique for coupling the compressor 14 and spindle 20 together. In FIGS. 4-7, the compressor 14 is shown having a surface 14b with two slots $14b_1$, $14b_2$ (see FIG. 5).

In operation, the diaphragm 16 is configured to respond to the closing force and make sealing contact with the weir portion 12b of the valve body 12 to interrupt the flow of fluid through the fluid flow channel 12a of the valve body 12. In FIGS. 2-4, the closing force would be a force applied on the spindle 20 directed or pushed downwardly (from the top to bottom of the page), as shown. The diaphragm 16 is also configured to respond to the opening force and release the sealing contact with the weir portion 12b to allow the flow of fluid through the fluid flow channel 12a of the valve body 12. In FIGS. 2-4, the opening force would be a force applied on the spindle 20 directed or pulled upwardly (from the bottom to top of the page), as shown. By way of example, the diaphragm 16 is shown as being made of Polytetrafluoroethylene (PTFE), which is a synthetic fluoropolymer of tetrafluoroethylene that is known in the art, although the scope of the invention is intended to include the diaphragm 16 being made from other types or kinds of materials either now known or later developed in the future.

The two studs 18a, 18b are configured to couple the compressor 14 and the diaphragm 16 together; attach to the diaphragm 16 so as to provide attachment points $P_1$, $P_2$ on the diaphragm 16 on each side of the weir portion 12b, as best shown in FIG. 4; respond to the closing force so that the attachment points $P_1$, $P_2$ on both sides of the weir portion 12b cause the diaphragm 16 to make sealing contact with the weir portion 12b of the valve body 12 for interrupting the flow of fluid through the fluid flow channel 12a of the valve body 12; and respond to the opening force so the attachment points $P_1$, $P_2$ on the both sides of the weir portion 12b cause the sealing contact between the diaphragm 16 and the weir portion 12b of the valve body 12 to be released for allowing the flow of fluid through the fluid flow channel 12a of the valve body 12.

In effect, the two studs 18a, 18b provide for non-criticality of stud positions for a reliable seal and improved opening. By way of example, each stud 18a, 18b is shown herein as being configured with one end $18a_1$, $18b_1$ (see FIG. 5) embedded within, or forming part of, the diaphragm 16, and with its other end $18a_2$, $18b_2$ having a ball-like member configured to be received and engaged in or by a respective slot $14b_1$, $14b_2$ of the compressor 14, as best shown in FIGS. 4-7. According to some embodiments of the present invention, the two studs 18a, 18b have intermediate stem-like portion $18a_3$, $18b_3$, and the ball-like members may be affixed on the ends $18a_2$, $18b_2$, including, e.g., by threading or screwing the ball-like members onto the ends $18a_2$, $18b_2$. The scope of the invention is intended to include other types or kinds of ways for coupling or affixing the intermediate stem-like portion $18a_3$, $18b_3$, and the ball-like members either now known or later developed in the future.

Figure 5:
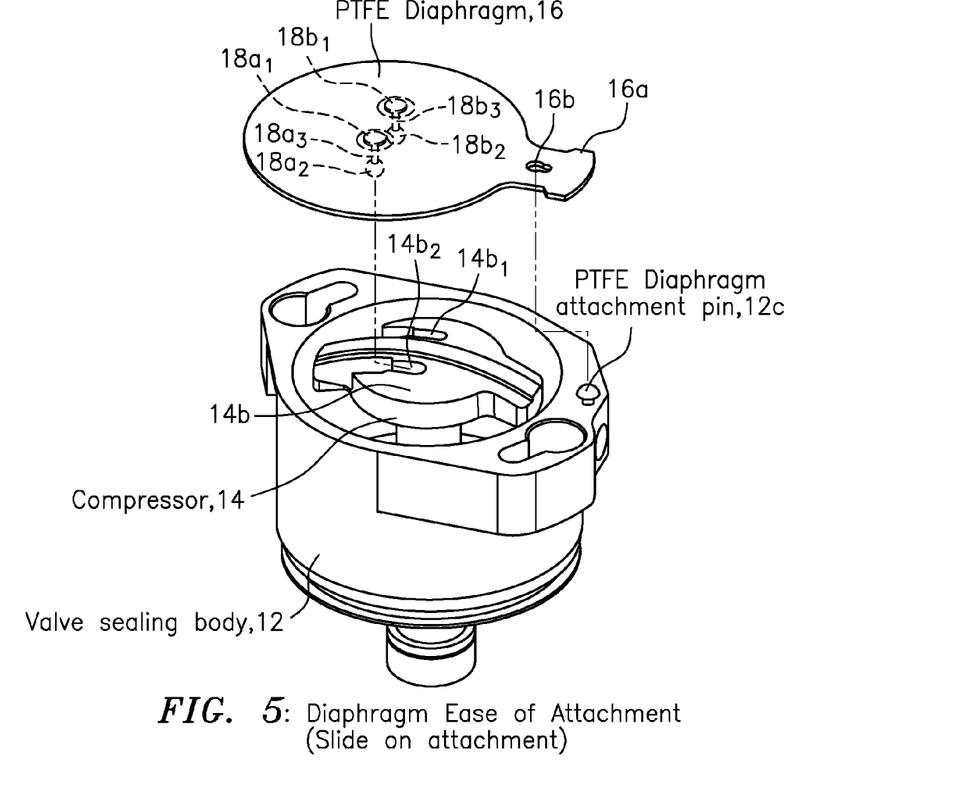
FIG. 5 is a view of sealing components according to some embodiments of the present invention.

As best shown in FIG. 5, the ball-like member of the two studs 18a, 18b is shown being received in an enlarged portion of the slots $14b_1$, $14b_2$ and the intermediate stem-like portion $18a_3$, $18b_3$ of the two studs 18a, 18b is configured for sliding into a narrower portion of the slots $14b_1$, $14b_2$. The ball-like member on each end $18a_2$, $18b_2$ is wider than the width of the slots $14b_1$, $14b_2$ so that the ball-like member on each end $18a_2$, $18b_2$ is retained in and engaged by the narrower portion of the slots $14b_1$, $14b_2$ once it is slid into the same.

Figure 6:
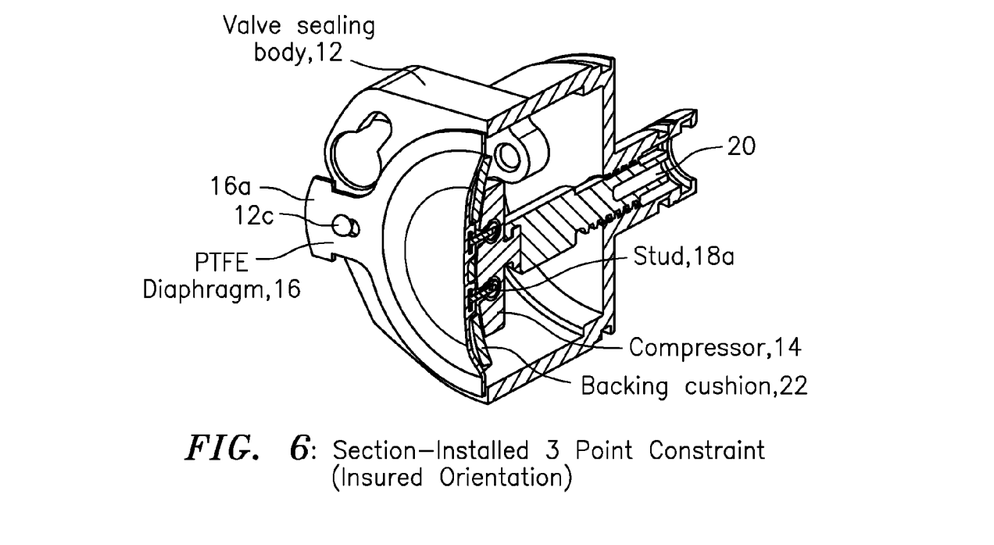
FIG. 6 is a cross-sectional view of valve sealing body according to some embodiments of the present invention.

The diaphragm 16 is configured with a portion 16a having a diaphragm attachment pin aperture 16b to receive and engage the diaphragm attachment pin 12c to provide a slide-on attachment and three point constraint to keep each ball-like member on the ends $18a_2$, $18b_2$ in the respective slot slots $14b_1$, $14b_2$ of the compressor 14.

The diaphragm valve 10 may also be configured with a backing cushion 22 arranged between the compressor 14 and the diaphragm 16, and configured with two apertures (one of which is shown as element 22a in FIG. 1) for receiving and passing the two studs 18a, 18b.

Figure 7:
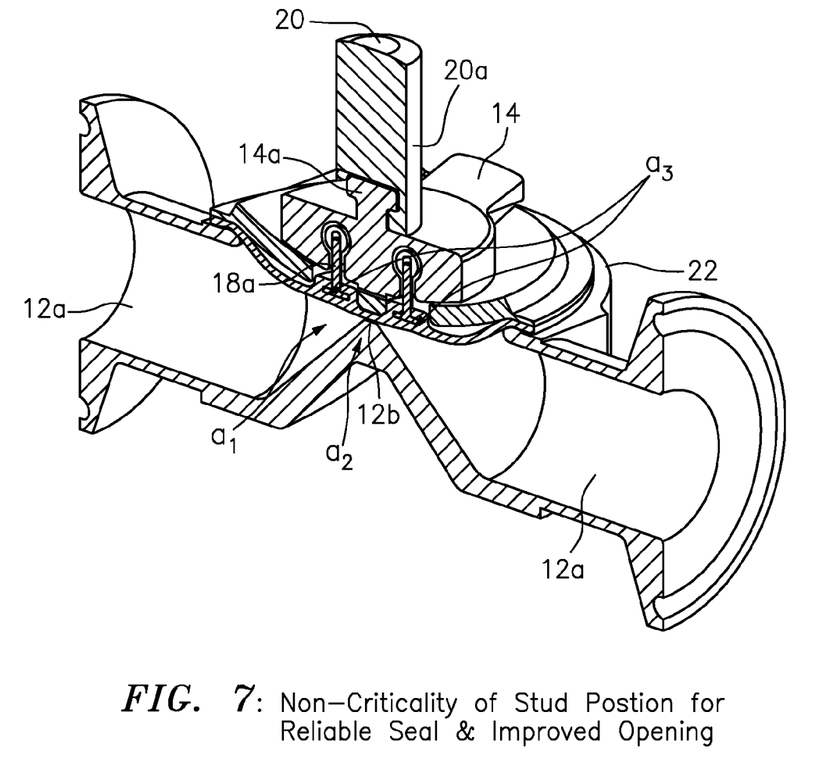
FIG. 7 is a cross-sectional view (parallel to the direction of flow) of sealing components in relation to the valve body according to some embodiments of the present invention.

FIG. 7 includes a first arrow $a_1$ pointing to the two studs 18a, 18b and the weir portion 12b and indicating that the stud position can vary according to the present invention; a second arrow $a_2$ pointing to the two studs 18a, 18b and the weir portion 12b and indicating that there is weir seal independence that results from the configuration according to the present invention; and a third arrow $a_3$ pointing to the two studs 18a, 18b and the weir portion 12b and indicating that the center and both sides experience a full opening stroke that results from the configuration according to the present invention.

The scope of the invention is also intended to include embodiments having more than two studs. For example, embodiments are envisioned in which the at least two studs 18a, 18b take the form of four studs that are configured to couple the compressor 14 and the diaphragm 16 together; and attach to the diaphragm 16 so as to provide four attachment points, e.g., including two attachment points on the diaphragm 16 on each side of the weir portion 12b. Embodiments are also envisioned in which the at least two studs 18a, 18b take the form of three studs that are configured to couple the compressor 14 and the diaphragm 16 together; and attach to the diaphragm 16 so as to provide three attachment points, e.g., including two attachment points on the pressure side of the weir portion 12b and one attachment point on the outlet side of the weir portion 12b.

Advantages

Some advantages of present invention include at least the following:
a) Ease of proper installation.
 The technique according to the present invention slides into place and is oriented by a passive bonnet constraint, as shown (see FIG. 5).
b) Relaxation of assembly dimensional constraints to attachment mechanism.
 The technique according to the present invention does not require tight tolerances on the stud positions to obtain a good seal.
c) Flow improvement with the same stroke.
Opening the diaphragm at two points to either side of the weir can result in improved flow characteristics over the standard opening mechanisms having the same stroke (spindle vertical motion).

Other variations or embodiments of the present invention may include, but are not limited to:
(1) Use of any form of mechanical attachment which opens the diaphragm without disrupting the centerline gasket uniformity. By way of examples, the attachment may include following:
 (a) Embedding the studs in the PTFE of a laminated diaphragm.
 (b) Embedding the studs between the PTFE and elastomer of a laminated diaphragm.
 (c) Embedding the studs in the elastomer section of a laminated diaphragm.
 (d) Embedding the studs in the elastomer diaphragm.
 (e) Use of other attachment methods away from the weir seal line, such as molded plastic or elastomer knobs or posts made as part of the diaphragm.
(2) Use of a multitude of attachment points located away from the weir seal line. Example: use four stud with two studs, knobs or posts on each side of the weir.
(3) Gasket cross section above the weir does not have to be uniform, as manipulation of local gasket thickness to achieve good seal characteristics is also possible using the method of attachment described in this disclosure.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What I claim is:
1. A diaphragm valve comprising:
 a valve body having a fluid flow channel configured with a weir portion to control the flow of fluid through the fluid flow channel;
 a diaphragm configured to respond to a closing force and to an opening force to make sealing contact with the weir portion to interrupt said flow, or to release the sealing contact with the weir portion to allow the flow;
 a compressor configured to apply the closing force or the opening force in order to interrupt or allow the flow; and
 at least two studs configured to:
  couple the compressor and the diaphragm together,
  attach to the diaphragm so as to provide attachment points on the diaphragm on each side of the weir portion,
 respond to the closing force or the opening force so that the attachment points on both sides of the weir portion cause the diaphragm to make sealing contact with the weir portion or cause the sealing contact to be released;
 each stud being configured with one end embedded within the diaphragm, and with another end having a ball-like member;
 the compressor being configured with two slots, each slot of the compressor configured to receive and engage a respective ball-like member on a respective end of a respective stud of the at least two studs;
 the valve body being configured with a diaphragm attachment pin; and
 the diaphragm having a portion configured with a diaphragm attachment pin aperture to receive and engage the diaphragm attachment pin to provide a slide on attachment and three point constraint to keep each ball-like member in a respective one of the two slots of the compressor.

2. A weir diaphragm valve comprising:
 a valve body having a fluid flow channel configured with a weir portion to control the flow of fluid through the fluid flow channel, the weir portion being a dam-like portion that is raised and extended across the fluid flow channel;
 a diaphragm configured to respond to a closing force to make sealing contact with the weir portion and provide a weir gasket seal to interrupt said flow, and also to respond to an opening force to release the sealing contact with the weir portion and the weir gasket seal to allow the flow of fluid;
 a compressor having a surface configured with at least two slots, having a compressor coupling member configured substantially in the center of the compressor inbetween the at least two slots of the compressor that are offset from the center, and being configured to apply the closing force in order to interrupt the flow, and also provide the opening force to allow the flow of fluid;
 at least two studs, each stud configured to receive and engage a respective slot of the at least two slots so as to attach together the diaphragm and the compressor, the at least two studs configured to:

attach to the diaphragm so as to provide attachment points on the diaphragm on each side of the weir portion, respond to the closing force so that the attachment points on both sides of the weir portion cause the diaphragm to provide the weir gasket seal and make sealing contact in the center and on both sides of the weir portion to interrupt the flow of fluid through the fluid flow channel, the weir gasket seal allowing controlled and even compression of the diaphragm along an entire length of the dam-like portion that is raised and extended across the fluid flow channel, and respond to the opening force so that the attachment points on both sides of the weir portion experience a full opening stroke in the center and on both sides of the weir portion and cause the weir gasket seal and the sealing contact to be released to allow the flow of fluid through the fluid flow channel; and a spindle having a spindle coupling member configured to couple to the compressor coupling member, the spindle configured to receive and apply the closing force and the opening force on the compressor.

3. The weir diaphragm valve according to claim 2, wherein the compressor is configured to respond to the closing force provided by the spindle and to apply the closing force to the at least two studs coupled in the at least two slots in order to interrupt the flow; and the compressor is also configured to respond to the opening force provided by the spindle and to apply the opening force to the at least two studs coupled in the at least two slots in order to allow the flow of fluid.

4. The weir diaphragm valve according to claim 3, wherein the spindle has a longitudinal axis;

the closing force is a downward force applied on the spindle directed or pushed downwardly along the longitudinal axis of the spindle; and the opening force is an upward force applied on the spindle directed or pulled upwardly along the longitudinal axis of the spindle.

5. The weir diaphragm valve according to claim 2, wherein the attachment points on the diaphragm are each offset from the center of the diaphragm.

6. The weir diaphragm valve according to claim 2, wherein each stud is configured with one end embedded within the diaphragm, and with another end having a ball-like member.

7. The weir diaphragm valve according to claim 6, wherein each slot is configured to receive and engage a respective ball-like member of a respective stud.

8. The weir diaphragm valve according to claim 2, wherein the weir diaphragm valve comprises a backing cushion arranged between the compressor and the diaphragm, and configured with two apertures for receiving and passing the at least two studs.

* * * * *